United States Patent
Briant et al.

(10) Patent No.: US 9,484,678 B1
(45) Date of Patent: Nov. 1, 2016

(54) ELECTRICAL CAGE MEMBER HAVING STANDOFF FEATURES

(71) Applicant: TYCO ELECTRONICS CORPORATION, Berwyn, PA (US)

(72) Inventors: Eric David Briant, Dillsburg, PA (US); Nikhil Shankar, Harrisburg, PA (US); Alex Michael Sharf, Harrisburg, PA (US); Michael David Herring, Apex, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 14/861,544

(22) Filed: Sep. 22, 2015

(51) Int. Cl.
*H01R 13/658* (2011.01)
*H01R 13/659* (2011.01)
*H01R 13/66* (2006.01)
*G02B 6/42* (2006.01)

(52) U.S. Cl.
CPC .......... *H01R 13/659* (2013.01); *G02B 6/4278* (2013.01); *H01R 13/665* (2013.01)

(58) Field of Classification Search
CPC .......... H01R 13/658; H01R 13/65802; H01R 23/6873; H01R 23/7073; H01L 23/4006
USPC ................................. 439/485, 607.2, 607.21
See application file for complete search history.

(56) References Cited

U.S. PATENT DOCUMENTS

| | | | | |
|---|---|---|---|---|
| 6,368,153 B1* | 4/2002 | Hwang | ................ | H05K 9/0058 439/353 |
| 6,416,361 B1* | 7/2002 | Hwang | ............ | H01R 13/65802 174/51 |
| 6,419,523 B1* | 7/2002 | Jones | ............... | H01R 13/65802 439/567 |
| 6,866,544 B1* | 3/2005 | Casey | ................ | H05K 9/0058 439/607.2 |
| 8,358,504 B2* | 1/2013 | McColloch | .......... | G02B 6/4269 361/679.46 |
| 8,393,917 B2* | 3/2013 | Regnier | ............. | H05K 7/20709 439/485 |
| 8,467,190 B2* | 6/2013 | Yi | ........................ | G02B 6/4269 361/679.46 |
| 8,613,632 B1* | 12/2013 | Nichols | .............. | H01R 13/6587 439/485 |
| 2002/0072274 A1* | 6/2002 | Flickinger | ........ | H01R 13/65802 439/607.2 |
| 2012/0058670 A1* | 3/2012 | Regnier | ........... | H01R 13/65802 439/485 |
| 2014/0206976 A1* | 7/2014 | Thompson | ........... | A61B 5/0006 600/391 |

* cited by examiner

*Primary Examiner* — Gary Paumen

(57) ABSTRACT

An electrical connector assembly includes a cage member having a plurality of walls comprising side walls and an end wall defining a port configured to receive a pluggable module that is electrically connected to a communication connector housed within the cage member. The port has an airflow channel along the end wall allowing airflow through the port along the pluggable module. Standoff features extend from at least one of the end wall and the side walls. The standoff features extend into the airflow channel and are configured to engage the pluggable module and locate the pluggable module relative to the communication connector for mating thereto and locate the pluggable module relative to the airflow channel.

20 Claims, 4 Drawing Sheets

US 9,484,678 B1

ELECTRICAL CAGE MEMBER HAVING STANDOFF FEATURES

BACKGROUND OF THE INVENTION

The subject matter herein relates generally to electrical connector assemblies for high speed optical and electrical communication systems.

It is known to provide a metal cage with a plurality of ports, whereby transceiver modules are pluggable therein. Several pluggable module designs and standards have been introduced in which a pluggable module plugs into a receptacle which is electronically connected to a host circuit board. For example, a well-known type of transceiver developed by an industry consortium is known as a gigabit interface converter (GBIC) or serial optical converter (SOC) and provides an interface between a computer and a data communication network such as Ethernet or a fiber network. These standards offer a generally robust design which has been well received in industry.

It is desirable to increase the operating frequency of the network connections. Electrical connector systems that are used at increased operating speeds present a number of design problems, particularly in applications in which data transmission rates are high, for example, in the range above 10 Gbps (Gigabits/second). One concern with such systems is reducing electromagnetic interference (EMI) emissions. Another concern is reducing operating temperatures of the transceivers.

In conventional designs, thermal cooling is achieved by using a heat sink and/or airflow over the outside of the shielding metal cage surrounding the receptacles. However, the thermal cooling provided by conventional designs is proving to be inadequate. Some cage designs allow airflow within the metal cage; however the various components within the cage, such as the port separator and receptacle connector, block or restrict airflow.

A need remains for an electrical connector assembly having improved thermal cooling compared to known assemblies.

BRIEF DESCRIPTION OF THE INVENTION

In one embodiment, an electrical connector assembly is provided including a cage member having a plurality of walls comprising side walls and an end wall between the side walls defining a port configured to receive a pluggable module therein through a front end of the cage member. The pluggable module is configured to be electrically connected to a communication connector housed within the cage member at a rear end of the cage member. The port has an airflow channel along the end wall allowing airflow through the port from the front end to the rear end along the pluggable module. The walls are manufactured from a conductive material and provide electrical shielding for the pluggable module. Standoff features extend from at least one of the end wall and the side walls. The standoff features extend into the airflow channel and are configured to engage the pluggable module and locate the pluggable module relative to the communication connector for mating thereto and locate the pluggable module relative to the airflow channel.

In another embodiment, an electrical connector assembly is provided including a cage member having a plurality of walls defining a port configured to receive a pluggable module therein through a front end of the cage member. The plurality of walls define side walls and an end wall between the side walls. The walls being are manufactured from a conductive material and providing electrical shielding. A communication connector is disposed within the cage member at a rear end of the cage member and positioned to mate with the pluggable module when the pluggable module is inserted into the port. Standoff features are integral with the end wall and extend into the port from the end wall. The standoff features are configured to engage the pluggable module and locate the pluggable module within the port. The standoff features define an airflow channel between the pluggable module and the end wall.

In a further embodiment, an electrical connector assembly is provided including a cage member having a plurality of walls defining a port extending between a front end and a rear end of the cage member. The walls define side walls and an end wall between the side walls. The port has an airflow channel along the end wall allowing airflow through the port from the front end to the rear end. The walls are manufactured from a conductive material and providing electrical shielding. A pluggable module is received in the port. The pluggable module has a circuit card held in a shell. The pluggable module has heat dissipation fins extending from the shell. The fins extend longitudinally at least partially between a mating end and an opposite end of the shell. A communication connector is disposed within the cage member at the rear end and positioned to mate with the pluggable module when the pluggable module is inserted into the port. Standoff features extend from at least one of the end wall and the side walls into the airflow channel. The standoff features engage the pluggable module and locate the pluggable module in the port such that the heat dissipation fins are located in the airflow channel.

DETAILED DESCRIPTION OF THE INVENTION

Figure 1:
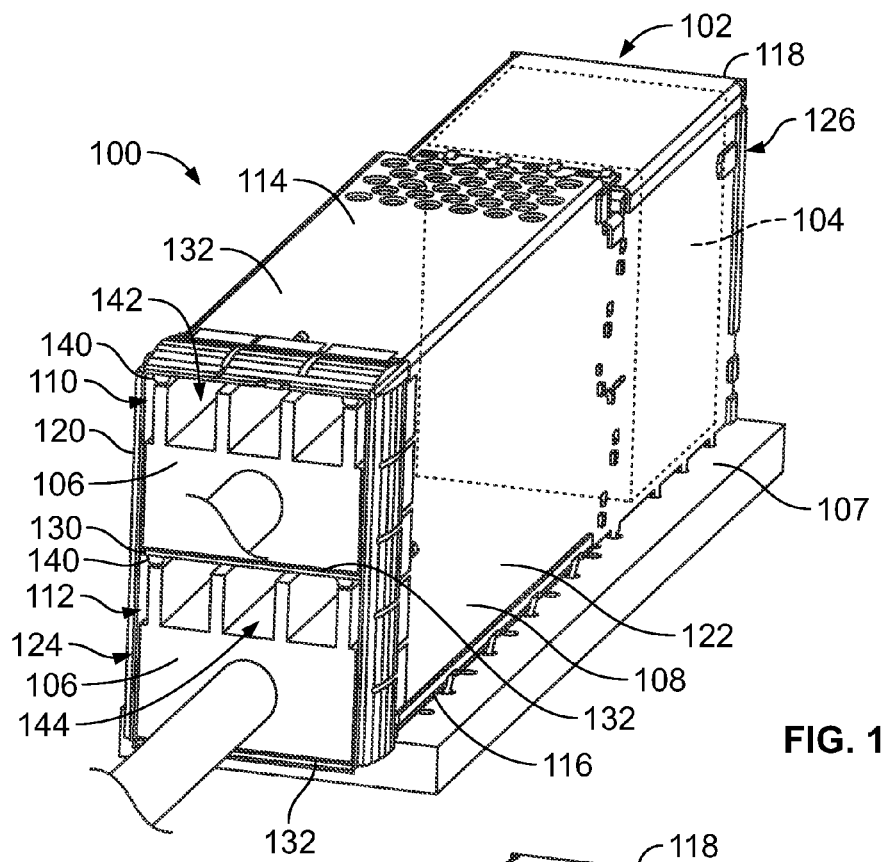
FIG. 1 is a front perspective view of an electrical connector assembly formed in accordance with an exemplary embodiment showing pluggable modules loaded into a cage member.
Figure 2:
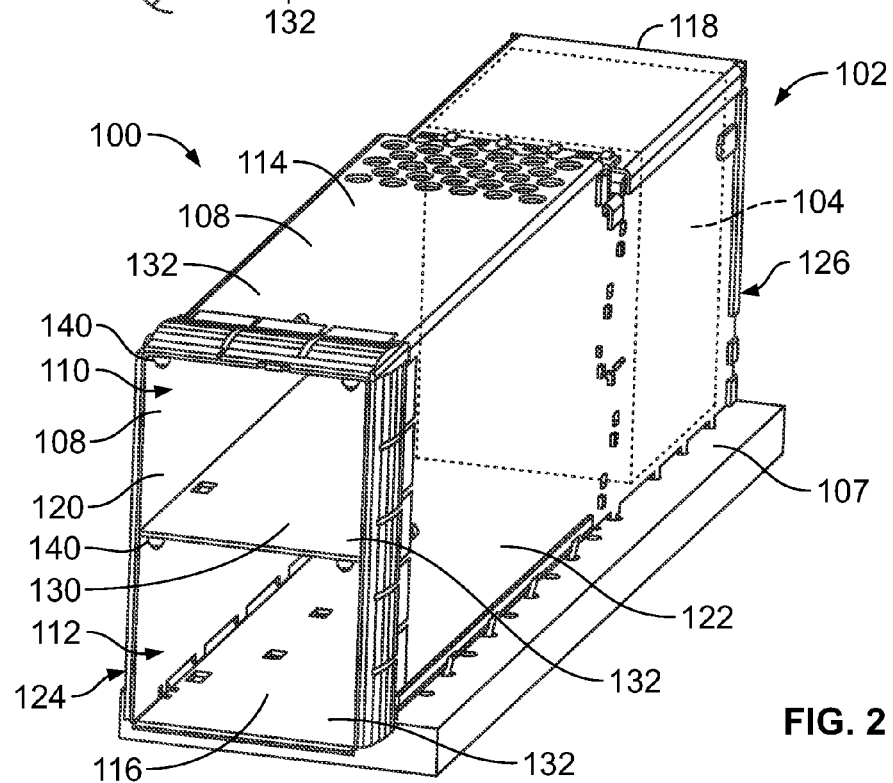
FIG. 2 is a front perspective view of the electrical connector assembly without the pluggable modules.

FIG. 1 is a front perspective view of an electrical connector assembly 100 formed in accordance with an exemplary embodiment showing pluggable modules 106 loaded into a cage member 102. FIG. 2 is a front perspective view of the electrical connector assembly 100 without the pluggable modules 106. The electrical connector assembly 100 includes the cage member 102 and a communication connector 104 (shown schematically in FIGS. 1 and 2, also illustrated in FIG. 3) received in the cage member 102. The pluggable modules 106 are configured to be loaded into the cage member 102 for mating with the communication connector 104. The cage member 102 and communication connector 104 are intended for placement on and electrical connection to a circuit board 107, such as a motherboard. The communication connector 104 is arranged within the cage member 102 for mating engagement with the pluggable modules 106.

The cage member 102 is a shielding, stamped and formed cage member that includes a plurality of shielding walls 108 that define multiple ports 110, 112 for receipt of the pluggable modules 106. In the illustrated embodiment, the cage member 102 constitutes a stacked cage member having the ports 110, 112 in a stacked configuration. The port 110 defines an upper port positioned above the port 112 and may be referred to hereinafter as upper port 110. The port 112 defines a lower port positioned below the port 110 and may be referred to hereinafter as lower port 112. Any number of ports may be provided in alternative embodiments. In the illustrated embodiment, the cage member 102 includes the ports 110, 112 arranged in a single column, however, the cage member 102 may include multiple columns of ports 110, 112 in alternative embodiments (for example, 2×2, 3×2, 4×2, 4×3, etc.). Additionally, while the cage member 102 is illustrated as a stacked cage member, the cage member 102 may be a single high cage member in alternative embodiments having a single port or a single row of ports rather than stacked ports.

The cage member 102 includes a top wall 114, a bottom wall 116, a rear wall 118 and side walls 120, 122, which together define the general enclosure or outer perimeter for the cage member 102. When ganged in multiple columns of ports 110, 112, at least some of the walls 108 may be interior divider walls defining side walls 120 or 122 for two different columns of ports 110, 112. Optionally, the top wall 114 may be non-planar and may be stepped downward at the rear, such as above the communication connector 104 (for example, rearward of the pluggable module 106), to improve airflow through the cage member 102.

The cage member 102 extends between a front end 124 and a rear end 126. The communication connector 104 may be positioned at or near the rear end 126 of the cage member 102. The pluggable modules 106 are configured to be loaded into the ports 110, 112 through the front end 124. Optionally, at least a portion of the bottom wall 116 may be open to allow the communication connector 104 to interface with the circuit board 107.

In an exemplary embodiment, the walls 108 may include a plurality of airflow openings or channels to allow airflow therethrough, such as from front to back, back to front and/or side to side. The airflow openings help cool the walls 108, the ports 110, 112 and/or the pluggable modules 106. The airflow openings may have any size and shape. In an exemplary embodiment, the size, shape, spacing and/or positioning of the airflow openings may be selected with consideration to thermal performance, shielding performance (for example electromagnetic interference (EMI) shielding), electrical performance, or other design considerations. Optionally, the stepped portion of the top wall 114 may include airflow openings.

The cage member 102 is subdivided by one or more divider walls 130. In the illustrated embodiment, the divider wall 130 extends horizontally between the side walls 120, 122. The divider wall 130 separates the upper port 110 from the lower port 112. In some embodiments, the divider wall 130 may be a single, planar wall. Alternatively, the divider wall 130 may be U-shaped having two parallel walls with a joining wall therebetween at the front end 124 and having a channel between the two parallel walls, such channel allowing airflow between the upper and lower ports 110, 112 and/or for routing light pipes or other components.

The top wall 114, bottom wall 116 and divider walls 130 define end walls which are provided at top or bottom ends of the ports 110, 112. The walls 114, 116, 130 may be referred to generally as end walls 132 or individually as a top end wall 114 or bottom end wall 130 of the upper port 110, or a top end wall 130 or bottom end wall 116 of the lower port 112. In an exemplary embodiment, airflow channels may be defined along some or all of the end walls 132, such as along the top end wall 114 and the top end wall 130 for the upper and lower ports 110, 112, respectively, as in the illustrated embodiment. In other various embodiments, airflow channels may additionally or alternatively be defined along the bottom end wall 130 and the bottom end wall 116 of the upper and lower ports 110, 112, respectively. In other various embodiments, the cage member may be oriented (for example, rotated 90° from the orientation shown) such that the end walls are not at the top and bottom, but rather the side walls are at the top and the bottom.

Optionally, the divider wall 130 may be approximately centered between the top wall 114 and the bottom wall 116. Alternatively, the divider wall 130 may be positioned closer to the top wall 114 than the bottom wall 116 such that the lower port 112 is taller than the upper port 110. As such, the lower port 112 allows more airflow therethrough than the upper port 110 for cooling the pluggable module 106 in the lower port 112. For example, because the upper port 110 has more exterior wall surface area for heat dissipation (for example, the top wall 114 is exposed to the exterior environment for cooling or dissipating heat into the ambient environment), the upper port 110 is naturally cooler than the lower port 112.

In an exemplary embodiment, the cage member 102 includes standoff features 140 extending from at least one of the walls 108. For example, the standoff features 140 may extend from at least one of the end walls 114, 116, 130. The standoff features 140 may extend from at least one of the side walls 120, 122. The standoff features 140 engage the pluggable module 106 and may locate the pluggable module 106 relative to the communication connector 104 for mating thereto. The standoff features 140 may locate the pluggable module 106 relative to airflow channels 142, 144 (shown in FIG. 1) in the corresponding port 110, 112 to hold the pluggable module 106 in position in the ports 110, 112 such that the pluggable module 106 does not completely block the airflow channel 142, 144. The standoff features 140 may hold the pluggable module 106 away from one of the end walls 130 to define an unobstructed portion of the airflow channel 142, 144. For example, the standoff features 140 may hold the pluggable modules 106 toward the bottom of the corresponding ports 110, 112 such that the pluggable modules 106 do not touch the tops of the corresponding ports 110, 112, or vice versa.

Figure 3:
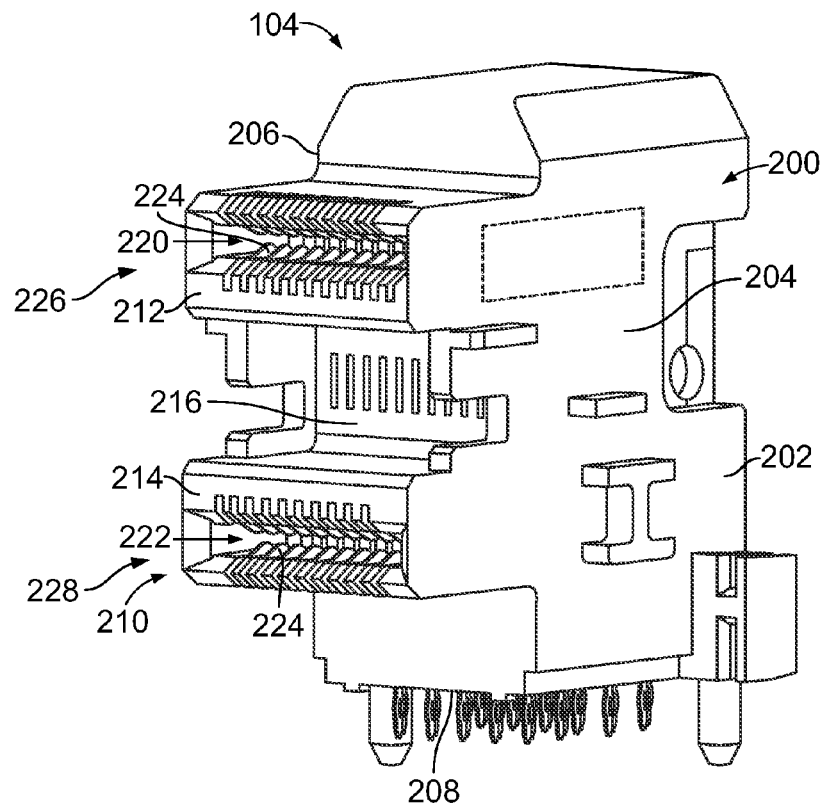
FIG. 3 is a front perspective view of a communication connector of the electrical connector assembly.

FIG. 3 is a front perspective view of the communication connector 104 in accordance with an exemplary embodiment. The communication connector 104 includes a housing 200 defined by an upstanding body portion 202 having sides 204, 206, a lower face 208 configured to be mounted to the circuit board 107 (shown in FIG. 1), and a mating face 210. Upper and lower extension portions 212 and 214 extend from the body portion 202 to define a stepped mating face 210. A recessed face 216 is defined between the upper and lower extension portions 212, 214 at the mating face 210 of the body portion 202.

Circuit card receiving slots 220 and 222 extend inwardly from the mating face 210 of each of the respective upper and lower extension portions 212, 214, and extend inwardly to the body portion 202. The circuit card receiving slots 220, 222 are configured to receive card edges of circuit cards of the corresponding pluggable modules 106 (shown in FIG. 4). A plurality of contacts 224 are held by the housing 200 and are exposed within the circuit card receiving slots 220, 222 for mating with the corresponding pluggable module 106. The contacts 224 and circuit card receiving slots 220, 222 define first and second mating interfaces 226, 228, respectively, of the communication connector 104.

The contacts 224 extend from the lower face 208 for termination to the circuit board 107. For example, the ends of the contacts 224 may constitute pins that are loaded into plated vias of the motherboard. Alternatively, the contacts 224 may be terminated to the circuit board 107 in another manner, such as by surface mounting to the circuit board 107.

Other types of communication connectors may be provided in alternative embodiments. For example, the communication connector may have a different mating interface. The housing may be shaped differently. The communication connector may have different types of contacts. For example, the communication connector may have contacts configured to mate with another type of pluggable module, such as a pluggable module that does not include a circuit card. Optionally, the communication connector may include multiple communication connector members that are stacked, with each communication connector member having a single mating interface and separately mountable to the circuit board.

Figure 4:
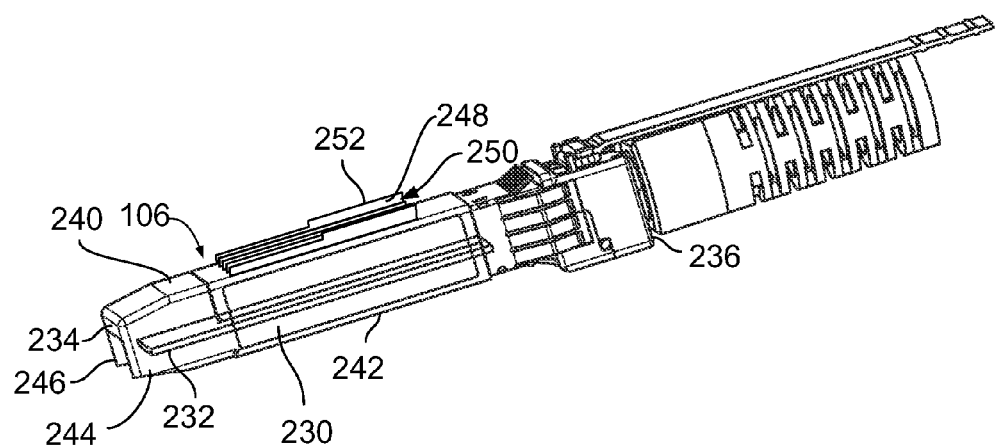
FIG. 4 illustrates an exemplary embodiment of one of the pluggable modules shown in FIG. 1.

FIG. 4 illustrates an exemplary embodiment of the pluggable module 106 for use with electrical connector assembly 100 (shown in FIG. 1). In the illustrated embodiment, the pluggable module 106 constitutes a small form-factor pluggable (SFP) module; however other types of pluggable modules or transceivers may be used in alternative embodiments. The pluggable module 106 includes a conductive body, such as a metal body, or shell 230 holding a circuit card 232 at a mating end 234 thereof for interconnection into one of the slots 220 or 222 (shown in FIG. 3) of the communication connector 104 (shown in FIG. 3). The pluggable module 106 includes an electrical interconnection within the module to an interface at end 236, such as a copper interface in the way of a modular jack, or to a fiber optic connector for further interfacing. Optionally, a cable, such as an electrical cable or an optical cable, may extend from the end 236 and be terminated inside the shell 230, such as directly to the circuit card 232 or to a connector mounted to the circuit card 232.

The shell 230 has a top 240, a bottom 242 and sides 244, 246 between the top 240 and the bottom 242. Optionally, the pluggable module 106 may include thermal interface features 248 configured to provide a thermal interface with the cage member 102 (shown in FIG. 1), such as for direct thermal contact or communication with the cage member 102. In the illustrated embodiment, the thermal interface features 248 are heat dissipation fins and may be referred to hereinafter as heat dissipation fins 248. The heat dissipation fins 248 may extend from any portion of the shell 230, such as the top 240, the bottom 242 and/or the sides 244. In an exemplary embodiment, the shell 230 is thermally conductive, such as a metal material, and the heat dissipation fins 248 dissipate heat from the shell 230. The heat dissipation fins 248 extend longitudinally at least partially between the mating end 234 and the opposite end 236 of the shell 230. The heat dissipation fins 248 define channels 250 between the heat dissipation fins 248 that allow airflow along the shell 230 and the heat dissipation fins 248, which cools the pluggable module 106. The heat dissipation fins 248 have outer edges 252. The outer edges 252 may be configured to engage portions of the cage member 102 when loaded therein. In alternative embodiments, the pluggable module 106 may not include heat dissipation fins.

The pluggable module may include a latching feature for securing the pluggable module 106 in the cage member 102. The latching feature may be releasable for extraction of the pluggable module 106. Other types of pluggable modules or transceivers may be utilized in alternative embodiments.

Figure 5:
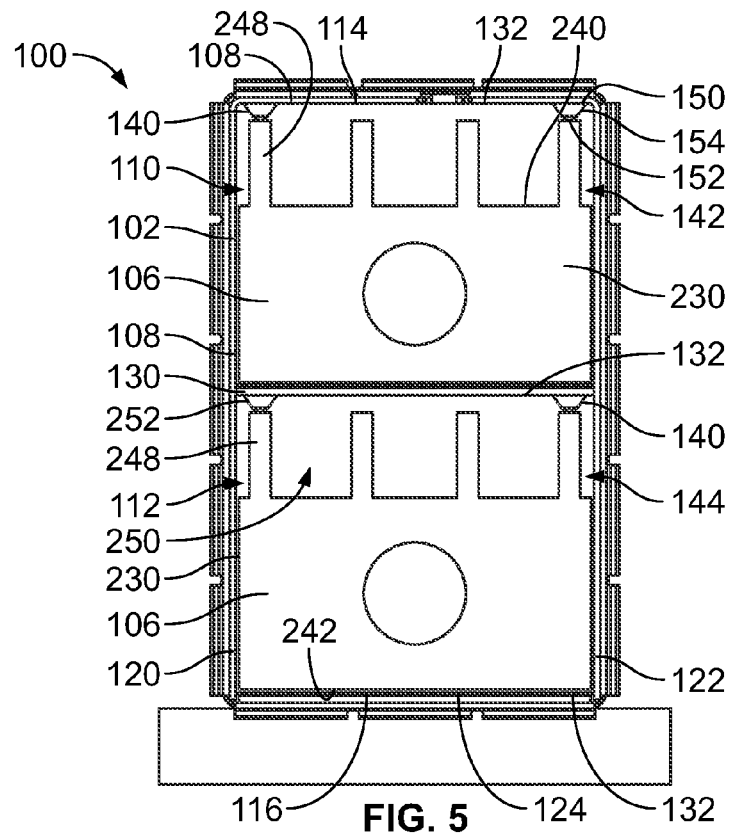
FIG. 5 is a front view of the electrical connector assembly showing the pluggable modules loaded in the cage member.
Figure 6:
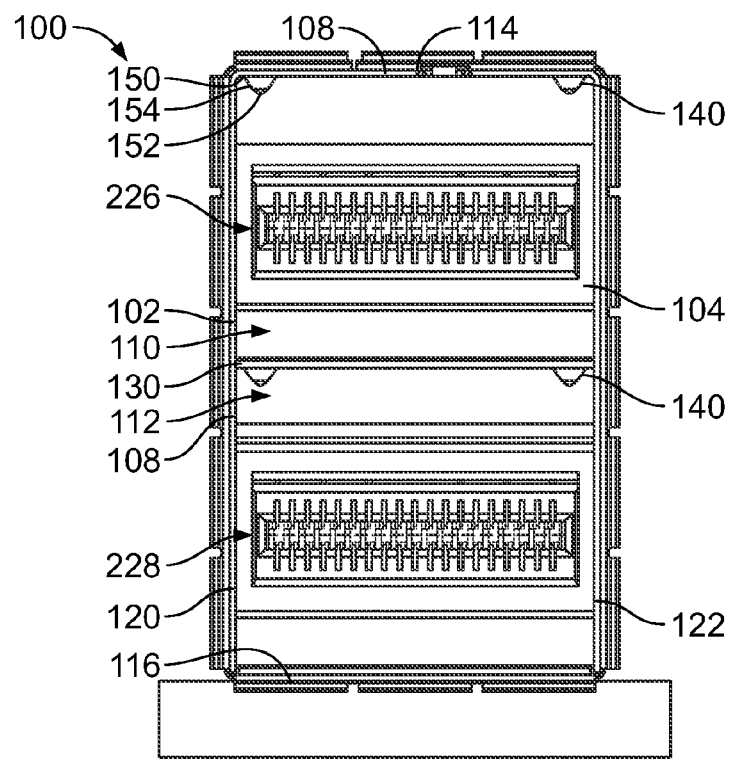
FIG. 6 is a front view of the electrical connector assembly with the pluggable modules removed to illustrate the cage member and the communication connector.

FIG. 5 is a front view of the electrical connector assembly 100 showing the pluggable modules 106 loaded in the cage member 102. FIG. 6 is a front view of the electrical connector assembly 100 with the pluggable modules 106 removed to illustrate the cage member 102 and the communication connector 104. In an exemplary embodiment, each port 110, 112 includes an airflow channel 142, 144, respectively. The airflow channels 142 144 allow cooling airflow along the pluggable modules 106, such as along the heat dissipation fins 248 of the pluggable modules 106.

Optionally, the standoff features 140 may engage corresponding heat dissipation fins 248 to hold the heat dissipation fins 248 and the pluggable modules 106 off of the end walls 132 (for example, the top wall 114 and the divider wall 130 of the upper and lower ports 110, 112, respectively). Alternatively, the heat dissipation fins 248 may engage the shells 230 of the pluggable modules 106 rather than the heat dissipation fins 248. In an exemplary embodiment, the standoff features 140 hold the pluggable modules 106 remote from the end walls 132 such that the airflow channels 142, 144 are located between the pluggable modules 106 and the corresponding end walls 132. For example, the standoff features 140 may engage the heat dissipation fins 248 of the pluggable modules 106 to hold the heat dissipation fins 248 a distance from the corresponding end wall 132 such that at least a portion of the airflow channel 142, 144 is located above the heat dissipation fins 248. The standoff features 140 may align the pluggable modules 106 in the ports 110, 112 with the mating interfaces 226, 228 (FIG. 6) of the communication connector 104 for mating with the communication connector 104.

The standoff features 140 associated with the different ports 110, 112 may have different sizes, such as to position the pluggable modules 106 at different heights within the ports 110, 112, to accommodate different sized pluggable modules 106 and/or to define different sized airflow channels 142, 144. For example, as noted above, the lower port 112 may be taller than the upper port 110 to allow greater airflow through the lower port 112 than through the upper port 110 for better cooling of the pluggable module 106 in the lower port 112. The standoff features 140 associated with the lower port 112 may be longer than the standoff features 140 associated with the upper port 110 to define a taller lower port 112 and thus a taller airflow channel 142, 144. In other various embodiments, the upper port 110 may not include any standoff features 140, but rather only the lower port 112 includes standoff features 140. In such embodiment, the pluggable module 106 in the upper port 110 directly engages the top end wall 114 while the standoff features 140 in the lower port 112 hold the pluggable module 106 away from the divider wall 130.

In an exemplary embodiment, the standoff features 140 are integral with the cage member 102. For example, the standoff features 140 may be stamped and formed with the corresponding wall 108 or may be otherwise formed with the wall 108, such as by a drawing process or another forming process. The standoff features 140 each have a base 150 at the end wall 132 and a distal end 152 opposite the base 150. The distal end 152 engages the pluggable module 106 to hold the pluggable module 106 remote from the end wall 132. For example, the distal end 152 may engage the outer edge 252 of one of the heat dissipation fins 248. Alternatively, the distal end 152 may engage the top 240 of the shell 230 of the pluggable module 106. For example, the standoff feature 140 may pass through one of the channels 250 between the heat dissipation fins 248 to engage the top 240. The standoff features 140 have sides 154 extending between the base 150 and the distal end 152. The sides 154 may be angled with a wider base 150 and a narrower distal end 152.

In the illustrated embodiment, the standoff features 140 are V-shaped ribs extending longitudinally along the end walls 132 at least partially between the front end 124 and the rear end 126 (shown in FIG. 1). The standoff features 140 may be referred to hereinafter as ribs 140. Optionally, the ribs 140 may extend a majority of a length of the cage member 102 between the front end 124 and the rear end 126. Any number of ribs 140 may be provided; however, in the illustrated embodiment, two ribs 140 are provided proximate to the two side walls 120, 122 that are configured to engage the two outer-most heat dissipation fins 248. The standoff features 140 may have other shapes in alternative embodiments.

In the illustrated embodiment, the bottoms 242 of the pluggable modules 106 engage the bottom end walls 132 (for example, the divider wall 130 and the bottom wall 116). The walls 108 and the standoff features 140 have a tight tolerance to locate the pluggable modules 106 (for example, side-to-side and top-to-bottom) within the ports 110, 112 for mating with the communication connector 104. In other various embodiments, the bottom end walls 132 may additionally or alternatively include the standoff features 140 to define airflow channels beneath the pluggable modules 106.

Figure 7:
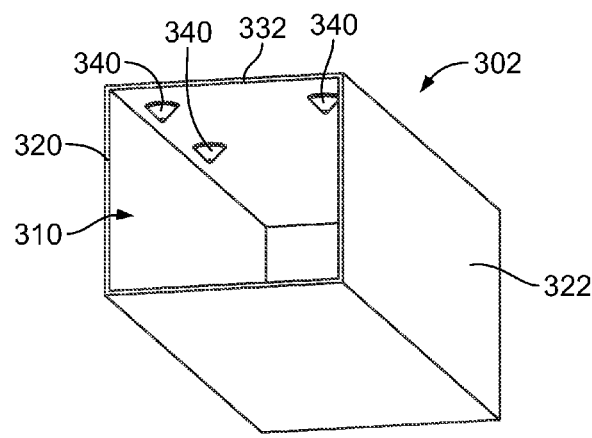
FIG. 7 is a front perspective view of a cage member formed in accordance with an exemplary embodiment.
Figure 8:
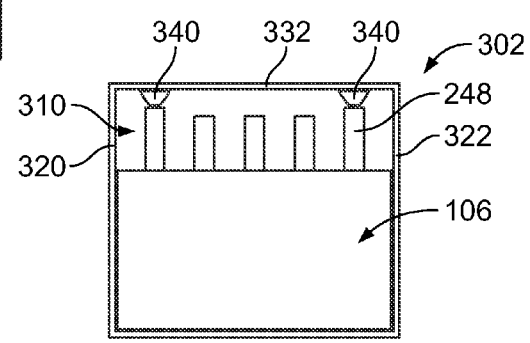
FIG. 8 is a front view of the cage member shown in FIG. 7 with a pluggable module loaded therein.

FIG. 7 is a front perspective view of a cage member 302 formed in accordance with an exemplary embodiment. FIG. 8 is a front view of the cage member 302 with the pluggable module 106 loaded therein. The cage member 302 is similar to the cage member 102 (shown in FIG. 1); however the cage member 302 is a single port cage member rather than a stacked or multi-port cage member. Additionally, the cage member 302 includes standoff features 340 that are shaped differently than the standoff features 140 (shown in FIG. 6).

The standoff features 340 are protrusions extending from an end wall 332 of the cage member 302. The standoff features 340 may be referred to hereinafter as protrusions 340. The protrusions 340 are conical shaped; however, the protrusions 340 may have other shapes in alternative embodiments. The standoff features 340 are integral with the end wall 332 and may be formed by drawing, swaging, coining or other forming processes. The standoff features 340 are arranged in rows, such as a first row proximate to a first side wall 320 and a second row proximate to a second side wall 322. The standoff features 340 are configured to be aligned with different heat dissipation fins 248 (FIG. 8) of the pluggable module 106. Any number of standoff features 340 may be provided. The standoff features 340 locate the pluggable module 106 in a port 310 of the cage member 302. The standoff features 340 may locate the pluggable module 106 within the port 310 to define an airflow channel therein, such as along the end wall 332. The standoff features 340 hold the pluggable module 106 clear of such airflow channel such that at least a portion of the airflow channel is unobstructed by the pluggable module 106. The standoff features 340 may hold the pluggable module 106 away from the end wall 332 to define the unobstructed portion of the airflow channel.

Figure 9:
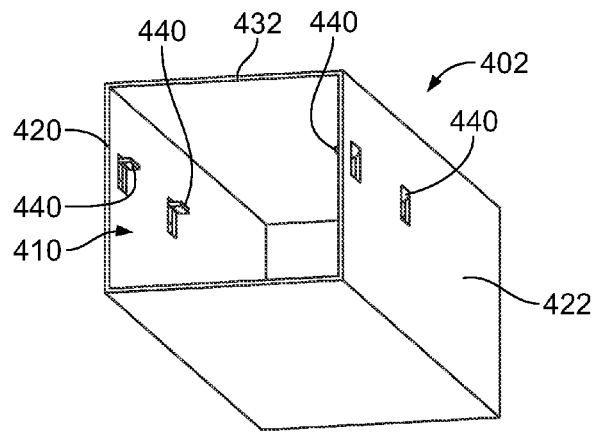
FIG. 9 is a front perspective view of a cage member formed in accordance with an exemplary embodiment.
Figure 10:
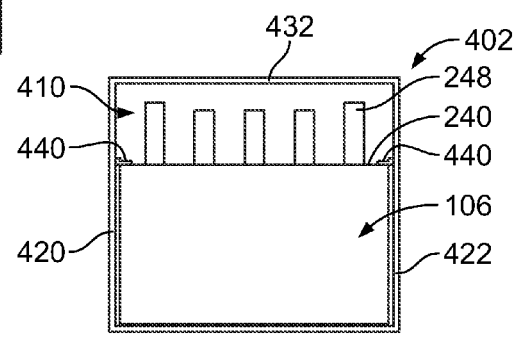
FIG. 10 is a front view of the cage member shown in FIG. 9 with a pluggable module loaded therein.

FIG. 9 is a front perspective view of a cage member 402 formed in accordance with an exemplary embodiment. FIG. 10 is a front view of the cage member 402 with the pluggable module 106 loaded therein. The cage member 402 is similar to the cage member 102 (shown in FIG. 1); however the cage member 402 is a single port cage member rather than a stacked or multi-port cage member. Additionally, the cage member 402 includes standoff features 440 that are shaped differently than the standoff features 140 (shown in FIG. 6) and that are located along side walls 420, 422 of the cage member 402 rather than along an end wall 432 of the cage member 402.

The standoff features 440 are rails extending from the side walls 420, 422 of the cage member 402. Any number of standoff features 440 may be provided. The standoff features 440 may be referred to hereinafter as rails 440. The rails 440 are stamped from the side walls 420, 422 and bent or formed into a port 410 of the cage member 402. The rails 440 are integral with the side walls 420, 422. The rails 440 are configured to engage the top 240 of the pluggable module 106 and hold the pluggable module 106 in the port 410. The airflow channel of the port 410 is defined above the rails 440. The rails 440 hold the pluggable module 106 clear of such airflow channel such that at least a portion of the airflow channel is unobstructed by the pluggable module 106. The rails 440 may hold the pluggable module 106, including the heat dissipation fins 248 (shown in FIG. 4) away from the end wall 432.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. An electrical connector assembly comprising:
a cage member having a plurality of walls comprising side walls and an end wall between the side walls defining a port configured to receive a pluggable module therein through a front end of the cage member, the pluggable module being configured to be electrically connected to a communication connector housed within the cage member at a rear end of the cage member, the port having an airflow channel along the end wall allowing airflow through the port between the front end and the rear end along the pluggable module, the walls being manufactured from a conductive material and providing electrical shielding for the pluggable module; and
standoff features extending from at least one of the end wall and the side walls, the standoff features extending into the airflow channel, the standoff features configured to engage the pluggable module and locate the pluggable module relative to the communication connector for mating thereto and locate the pluggable module relative to the airflow channel.

2. The electrical connector assembly of claim 1, wherein the standoff features hold the pluggable module remote from the end wall such that the airflow channel is located between the pluggable module and the end wall.

3. The electrical connector assembly of claim 1, wherein the standoff features align the pluggable module in the port with the communication connector for mating with the communication connector.

4. The electrical connector assembly of claim 1, wherein the standoff features each have a base at the corresponding wall of the cage member and a distal end opposite the base, the distal end engaging the pluggable module to hold the pluggable module remote from the end wall.

5. The electrical connector assembly of claim 4, wherein the standoff features each include a side between the base and the distal end, the side engaging the pluggable module.

6. The electrical connector assembly of claim 1, wherein the standoff features comprise protrusions extending from the end wall into the port.

7. The electrical connector assembly of claim 1, wherein the standoff features comprise ribs extending a majority of a length of the cage member between the front end and the rear end.

8. The electrical connector assembly of claim 1, wherein the standoff features comprise rails extending from the side walls, the rails being positioned a first distance from the end wall, the first distance defining a height of the airflow channel.

9. The electrical connector assembly of claim 1, wherein the standoff features are integral with the walls.

10. The electrical connector assembly of claim 1, wherein the standoff features are configured to engage heat dissipation fins of the pluggable module to hold the heat dissipation fins a distance from the end wall such that at least a portion of the airflow channel is located above the heat dissipation fins.

11. The electrical connector assembly of claim 1, wherein the standoff features extend from the end wall, a first of the standoff features being located proximate to a first of the side walls, a second of the standoff features being located proximate to a second of the sidewalls.

12. The electrical connector assembly of claim 1, wherein the end wall comprises a top wall located above the port, the airflow channel being located above the pluggable module.

13. An electrical connector assembly comprising:
a cage member having a plurality of walls defining a port configured to receive a pluggable module therein through a front end of the cage member, the walls defining side walls and an end wall between the side walls, the walls being manufactured from a conductive material and providing electrical shielding;
a communication connector disposed within the cage member at a rear end of the cage member and positioned to mate with the pluggable module when the pluggable module is inserted into the port; and
standoff features integral with the end wall and extending into the port from the end wall, the standoff features configured to engage the pluggable module and locate the pluggable module within the port to define an airflow channel between the pluggable module and the end wall.

14. The electrical connector assembly of claim 13, wherein the standoff features hold the pluggable module remote from the end wall such that the airflow channel is located between the pluggable module and the end wall.

15. The electrical connector assembly of claim 13, wherein the standoff features comprise a first row of protrusions extending from the end wall into the port to engage a first heat dissipation fin of the pluggable module and a second row of protrusions extending from the end wall into the port to engage a second heat dissipation fin of the pluggable module.

16. The electrical connector assembly of claim 13, wherein the standoff features comprise ribs extending a majority of a length of the cage member between the front end and the rear end.

17. The electrical connector assembly of claim 13, wherein the standoff features are configured to engage heat dissipation fins of the pluggable module to hold the heat dissipation fins a distance from the end wall such that at least a portion of the airflow channel is located above the heat dissipation fins.

18. An electrical connector assembly comprising:
a cage member having a plurality of walls defining a port extending between a front end and a rear end of the cage member, the walls defining side walls and an end wall between the side walls, the port having an airflow channel along the end wall allowing airflow through the port from the front end to the rear end, the walls being manufactured from a conductive material and providing electrical shielding;
a pluggable module received in the port, the pluggable module having a circuit card held in a shell, the pluggable module having heat dissipation fins extending from the shell, the fins extending longitudinally at least partially between a mating end and an opposite end of the shell;
a communication connector disposed within the cage member at the rear end and positioned to mate with the pluggable module when the pluggable module is inserted into the port; and
standoff features extending from at least one of the end wall and the side walls into the airflow channel, the standoff features engaging the pluggable module and locating the pluggable module in the port such that the heat dissipation fins are located in the airflow channel.

19. The electrical connector assembly of claim 18, wherein the standoff features engage the heat dissipation fins of the pluggable module to hold the heat dissipation fins a distance from the end wall such that at least a portion of the airflow channel is located above the heat dissipation fins.

20. The electrical connector assembly of claim 18, wherein the standoff features engage the shell of the pluggable module to locate the heat dissipation fins in the airflow channel.

\* \* \* \* \*